United States Patent [19]

Maeda et al.

[11] Patent Number: 5,130,999
[45] Date of Patent: Jul. 14, 1992

[54] LASER DEVICE

[75] Inventors: Mitsuo Maeda, Fukuoka; Kazuo Shimazaki, Tokyo, both of Japan

[73] Assignee: Mitsui Petrochemical Industries, Ltd., Tokyo, Japan

[21] Appl. No.: 623,094

[22] Filed: Dec. 6, 1990

[30] Foreign Application Priority Data

Dec. 6, 1989 [JP] Japan .................. 1-316758
Dec. 6, 1989 [JP] Japan .................. 1-316759

[51] Int. Cl.$^5$ ............................... H01S 3/04
[52] U.S. Cl. ............................ 372/35; 372/70; 372/72
[58] Field of Search ....................... 372/35, 72, 70

[56] References Cited

U.S. PATENT DOCUMENTS

| | | | |
|---|---|---|---|
| 4,506,369 | 3/1985 | Houston | 372/35 |
| 4,563,763 | 1/1986 | Kuhn | 372/35 |
| 4,601,038 | 7/1986 | Guch, Jr. | 372/35 |
| 4,751,716 | 6/1988 | Ream et al. | 372/35 |
| 4,894,837 | 1/1990 | DiFonzo et al. | 372/35 |
| 5,012,481 | 4/1991 | Castelerio | 372/35 |

Primary Examiner—Georgia Y. Epps
Attorney, Agent, or Firm—Sherman and Shalloway

[57] ABSTRACT

It is an object of the present invention to provide A laser device of long life. In the laser device, light source is housed in transparent cooling vessel, and the vessel is filled with a cooling liquid which is circulated. The electrodes of the light source project out of the cooling vessel. Reflectors are provided outside the cooling vessel. The electrodes and the reflectors are out of contact with the cooling liquid.

It is another object of the present invention to stabilize laser oscillation. A light source is housed in a first transparent cooling vessel. The first cooling vessel is filled with a first cooling liquid. A laser medium is housed in a second transparent cooling vessel. The second cooling vessel is filled with a second cooling liquid. A heat insulation layer is provided between the first and the second cooling vessels so that the first and the second cooling liquids are thermally insulated from each other.

6 Claims, 3 Drawing Sheets

LASER DEVICE

BACKGROUND OF THE INVENTION

The present invention relates to a laser device.

In a solid laser oscillation device, it is conventionally practiced that lamps for excitation, condensing reflectors for the lamps, the electrodes of the lamps, holders for the lamps, a laser rod and so forth are housed in a hermetic container, and cooling water is circulated to prevent the overheating of the lamps and the rod.

FIGS. 5 and 6 are schematic sectional views of a conventional solid laser device. To cool the excitation lamps 14 of the laser device, the electrodes 15 of the lamps are supported by holders 16, and the lamps are located inside the reflection surfaces of condensing reflectors 17 in a hermetic container 18. The excitation lamps 14 are cooled by a circulating liquid 13 such as pure water. The reflection surface of each of the condensing reflectors 17 is constituted by a layer of a plated metal such as silver, gold, chromium and aluminum and high in reflectance, or is constituted by the like. A cooling pipe 11 is provided around a laser medium 12 and divides the interior of the hermetic container 18. The pipe 11 is cooled by a liquid 13' flowing therein. The laser device has a drawback that when the device of the liquid immersion type performs laser oscillation for a long time, the plated metal layer constituting the high in reflectance mirror-like surface of the condensing reflector 17 and develops a trouble such as color change and corrosion to lower the efficiency of the laser oscillation or to make the oscillation impossible in some case. Particularly if the layer is made of plated silver, the device is likely to develop this kind of trouble even if the layer is coated with a protective layer of $SiO_2$ or the like. The device has another drawback that the purity of the cooling liquid 13 in the hermetic container 18 falls along with the long time use of the device to lower the reflectance of the condensing reflector or cause an extraneous substance to cling to the electrodes of the lamps to change the electric properties of the surface of the electrodes, to make the contact of the electrodes and the holders improper or to break the mutual electric insulation of the electrodes. In consequence, the laser oscillation by the device drops greatly in efficiency or becomes impossible.

The present invention was made in consideration of the drawbacks mentioned above. Accordingly, it is the first object of the invention to provide a laser device of long life.

When the laser device performs the laser oscillation while the temperature of the laser medium 12 is controlled to be 85° C., for example, the liquid 13 having a low temperature of about 15° C. is caused to flow between the condensing reflector 17 and the glass pipe 11 to cool the excitation lamps 14 and the liquid 13' whose temperature is controlled to set the temperature of the laser medium at 85° C. is caused to flow in the glass pipe. In that case, since the liquid 13 for controlling the temperature of the laser medium 12 and the other liquid 13' for cooling the lamps 14 come near each other while being separated from each other only by the glass pipe 11, both the liquids are not sufficiently insulated thermally from each other. For that reason, the temperature of the liquid 13 is affected by that of the other liquid 13' on and near the boundary of them so that the temperature of the former becomes unstable of fluctuates to make the laser oscillation unstable.

The present invention was made in consideration of the latter drawback as well. Accordingly, it is the second object of the invention to keep the temperature of a laser medium constant to stabilize laser oscillation.

SUMMARY OF THE INVENTION

According to the present invention, means described hereinafter are provided in order to eliminate the drawbacks mentioned above.

The laser device, the providing of which is the first object mentioned above, includes a laser medium; a light source (pumping source) having electrodes to which electric power is applied; and reflectors by which light emitted from the light source is reflected to the laser medium. The light source is housed in transparent cooling vessels. The vessels are filled with a cooling liquid which is circulated. The electrodes project out of the cooling vessels. The reflectors are located outside the cooling vessels. The laser medium, which needs to be cooled, is housed together with the light source in the cooling vessels so as to be cooled by the cooling liquid, or is housed in other cooling vessels so as to be cooled by another cooling liquid which is circulated. Although it is preferable that the cooling vessels are transparent glass pipes, the vessels may be others as far as it is possible that the vessels are filled with the cooling liquids and the light emitted from the light source pass through the vessels. The laser medium, the light source and the reflectors may be provided in a hermetic casing so that the light source is housed in the cooling vessels in the casing. In that case, if the electrodes project out of the cooling vessels and the hermetic casing, the electrodes are protected better. Since the electrodes and the reflectors are located outside the cooling vessels, the electrodes and the reflectors are kept out of contact with the cooling liquids. In that respect, the laser device is greatly different from the conventional laser device in which the cooling liquid flows in direct contact with the plated layers of the condensing reflectors or with the protective films on the layers.

A laser device, the stabilizing of the laser oscillation of which is the second object mentioned above, includes a laser medium; a light source (pumping source) having electrodes to which electric power is applied; and reflectors by which light emitted from the light source is reflected to the laser medium. The light source is housed in first transparent cooling vessel. The first cooling vessel is filled with a first cooling liquid. The laser medium is housed in a second transparent cooling vessel. The second cooling vessel is filled with a second cooling liquid. A heat insulation layer is provided between the first and the second cooling vessels so that the first and the second cooling liquids are thermally insulated from each other. It is preferable that the heat insulation layer is a layer of air or a layer of vacuum, the degree of which 0.01 torr to 1 torr. Since the first and the second cooling liquids are thermally insulated from each other, the light source and the laser medium are efficiently cooled.

DESCRIPTION OF PREFERRED EMBODIMENTS

A perforated embodiments provided in accordance with the present invention, are hereafter described concretely with reference to the drawings attached hereto.

Embodiment 1

Figure 1:
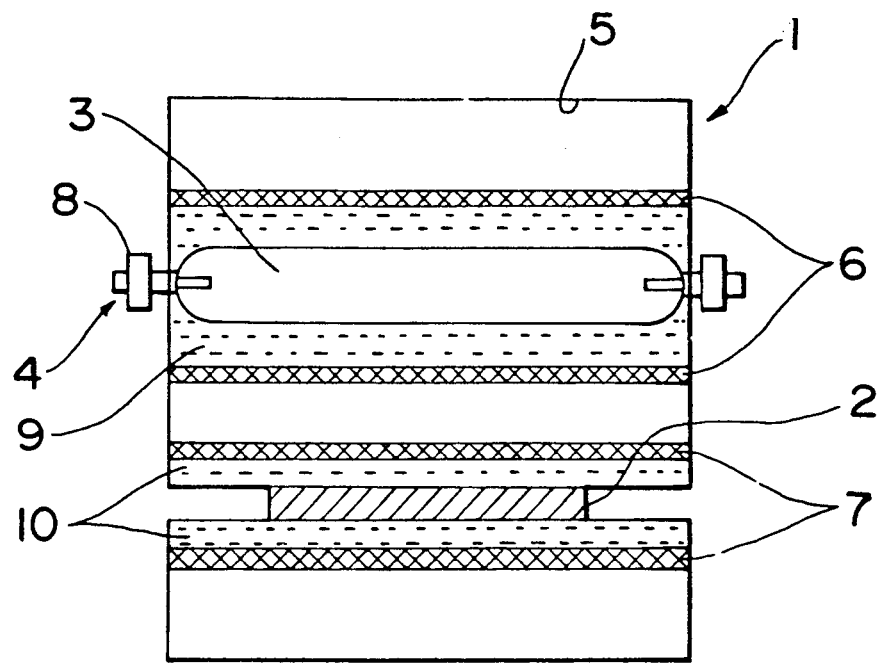
FIG. 1 is a longitudinally sectional view of a laser device which is the first embodiment of the present invention.
Figure 2:
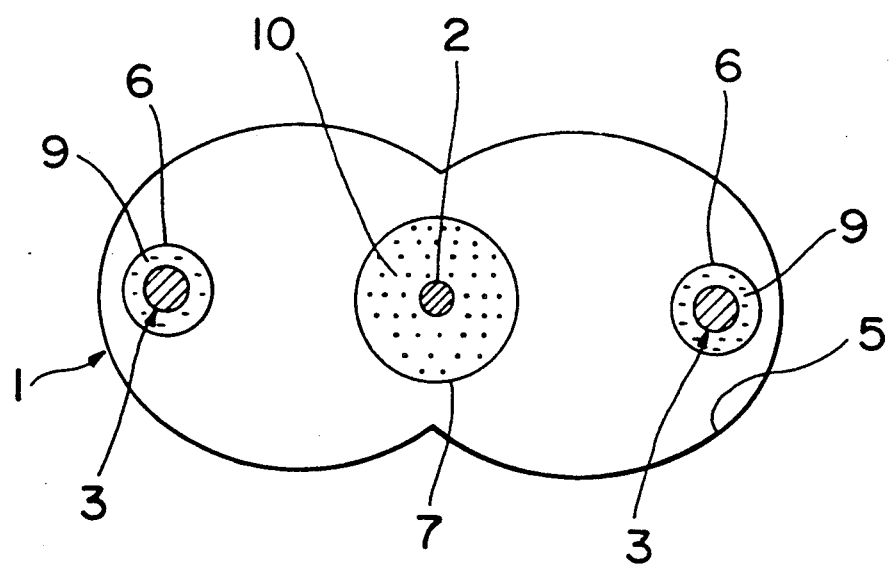
FIG. 2 is a cross-sectional view of the device.

FIGS. 1 and 2 are schematic views of a solid laser device which is an embodiment of the present invention. In the laser device, a laser medium 2, which is alexandrite, two flash lamp 3, which are light sources, and a resonator, which oscillates light emitted from the lamps, are provided in a hermetic casing 1. Each of the flash lamps 3 has two electrodes 4 to which electric power for optical pumping is applied. The resonator has reflectors 5 by which the light emitted from the flash lamps 3 is reflected so that the light proceeds to the laser medium 2. The reflectors 5 are opposite each other across the laser medium 2. Each focal point of the reflectors 5 is in the same position. Air is filled in the hermetic casing 1. The flash lamps 3 are housed in first cooling vessels 6 made of transparent glass pipes and located in the hermetic casing 1. The electrodes 4 project out of the first cooling vessels 6 and the hermetic casing 1, and are fitted with electrode holders 8 for securing the electrodes. A cooling liquid 9, which is pure water, is filled in the first cooling vessels 6, and circulated by circulator not shown in the drawings. The reflectors 5 are located inside the hermetic casing 1 but outside the first cooling vessels 6. The reflectors 5 are of the condensing type. The mirror-like surfaces of the reflectors 5 are constituted by layers of a plated metal high in reflectance. The laser medium 2 is housed in a second cooling vessel 7 which is also made of transparent glass pipe and provided in the hermetic casing 1. A cooling liquid 10, which is pure water, is filled in the second cooling vessel 7, and circulated by a circulator not shown in the drawings.

The light emitted from the flash lamps 3 proceeds to the laser medium 2 through the cooling liquid 9 and the first and the second transparent cooling vessels 6, 7 while some of the light is reflected by the reflectors 5. Some of the light coming out of the laser medium 2 is reflected by the opposite reflectors 5 and enters into the laser medium again. Such operation is repeated so that resonance is created to generate laser light which is emitted from the laser device. In the meantime, the flash lamps 3 and the laser medium 2 are cooled by the cooling liquids 9 and 10 in the first and the second cooling vessels 6 and 7. Since the electrodes 4 of the lamps 3 and the electrode holders 8 are located outside the cooling vessels 6, 7 and the hermetic casing 1 so that the cooling liquid 9 is out of contact with the electrodes and the holders, the electric properties of the surfaces of the electrodes are not altered due to the drop in the purity of the cooling liquid so as to deteriorate the electro conductive contact of the electrodes and the holders. The electric insulation of the electrodes 4 is not deteriorated and the mutual electric insulation of the electrodes is kept proper. Since the reflectors 5 are not in contact with the cooling liquids 9 and 10, the reflectance of the surfaces of the reflectors 5 is always kept good.

In this embodiment, the first cooling vessels 6 are provided in the hermetic casing 1 to divide the interior thereof and house the flash lamps 3 so that the reflectors 5 are separated enough from the cooling liquids 9 and 10. Besides, the electrodes 4 are located outside the hermetic casing 1 so that the electrodes are also separated enough from the cooling liquids 9 and 10. As a result, the reflection efficiency of the mirror-like surfaces of the reflectors 5 do not fall, and the electrodes 4 are kept in a proper condition. For that reason, the life of the laser device is made long. Since the electrodes 4 are located outside the hermetic casing 1, the atmosphere in the casing is not affected by minute electric discharge from the electrodes. It is preferable that the cooling vessels 6 and 7 and made of a substance transparent as to the wavelength of the light emitted from the flash lamps 3. For example, the substance is a synthetic quartz glass, a natural quartz glass, a cerium-doped natural quartz glass, a Pyrex glass or the like. The light source of the device are not confined to being the flash lamps 3, but may be what can perform optical excitation or optical pumping by discharge, an electrical current, laser operation, chemical reaction or the like and needs to be cooled. The laser medium 2 is not confined to being alexandrite, but may be a solid such as ruby, glass, titanium and sapphire.

As described above, since the electrodes and the reflectors are located outside the cooling vessels so that the electrodes and the reflectors are out of contact with the cooling liquids, the electrodes are kept in the normal condition and the reflection efficiency of the mirror-like surfaces or the reflectors does not fall. This results in making the life of the laser device long.

Embodiment 2

Figure 3:
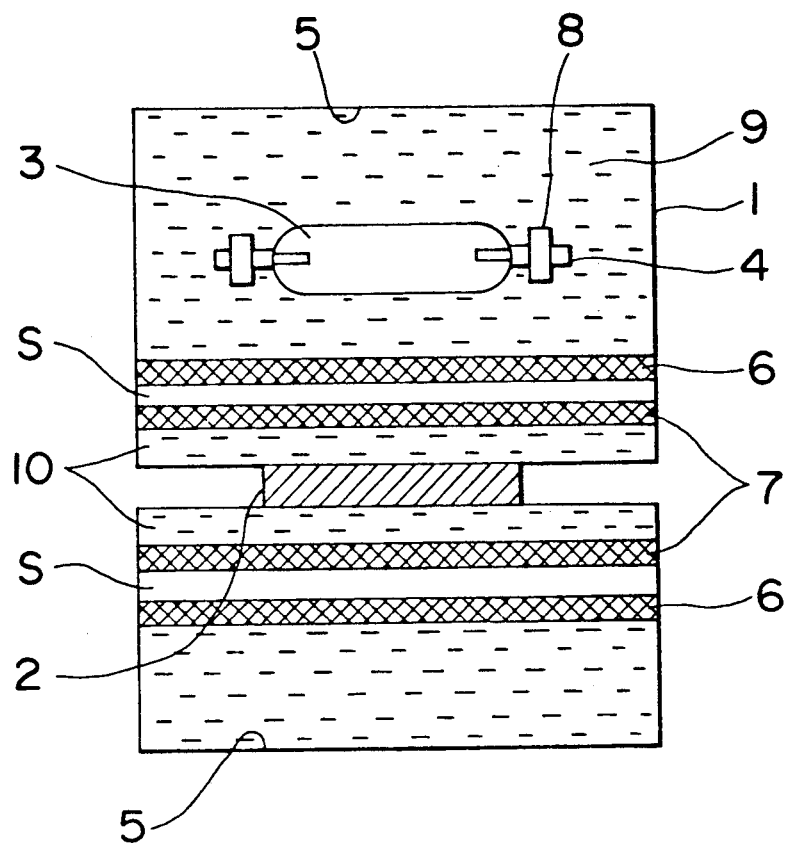
FIG. 3 is a longitudinally sectional view of a laser device which is the second embodiment of the present invention.
Figure 4:
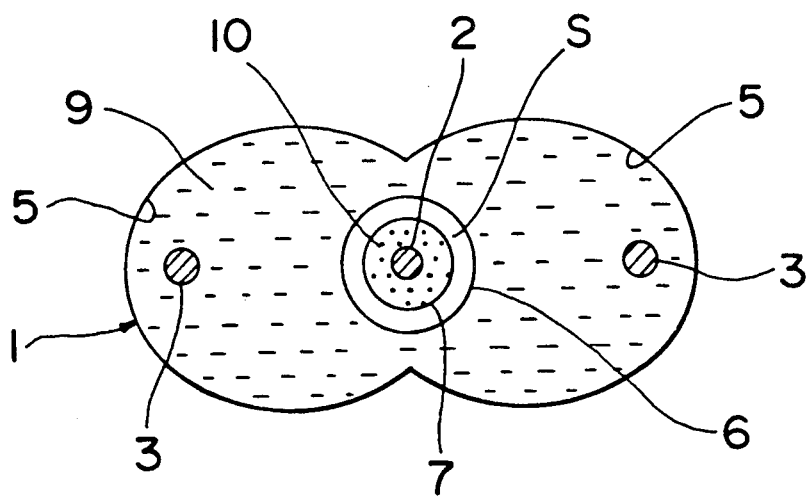
FIG. 4 is a cross sectional view of the device shown in FIG. 3.
Figure 5:
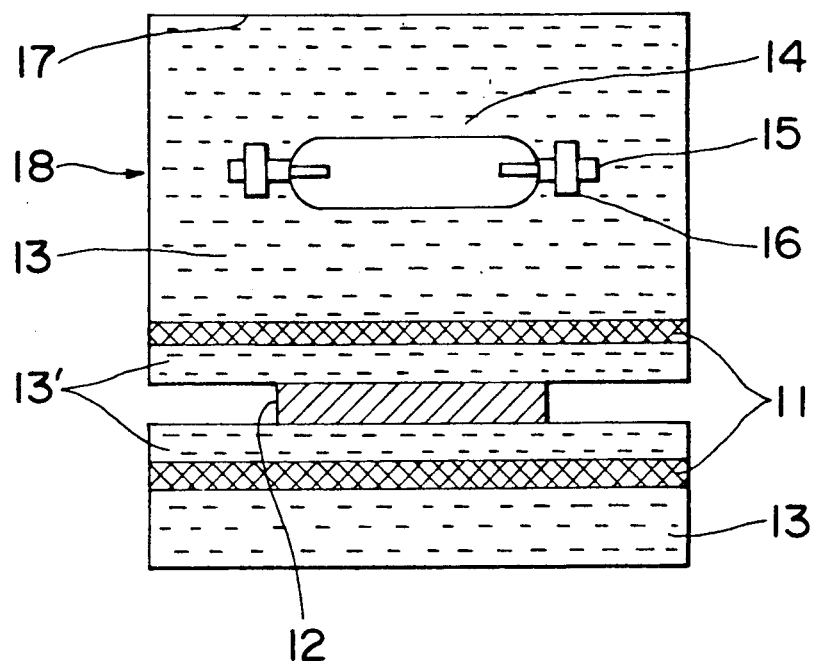
FIG. 5 is a longitudinally sectional view of a conventional laser device.
Figure 6:
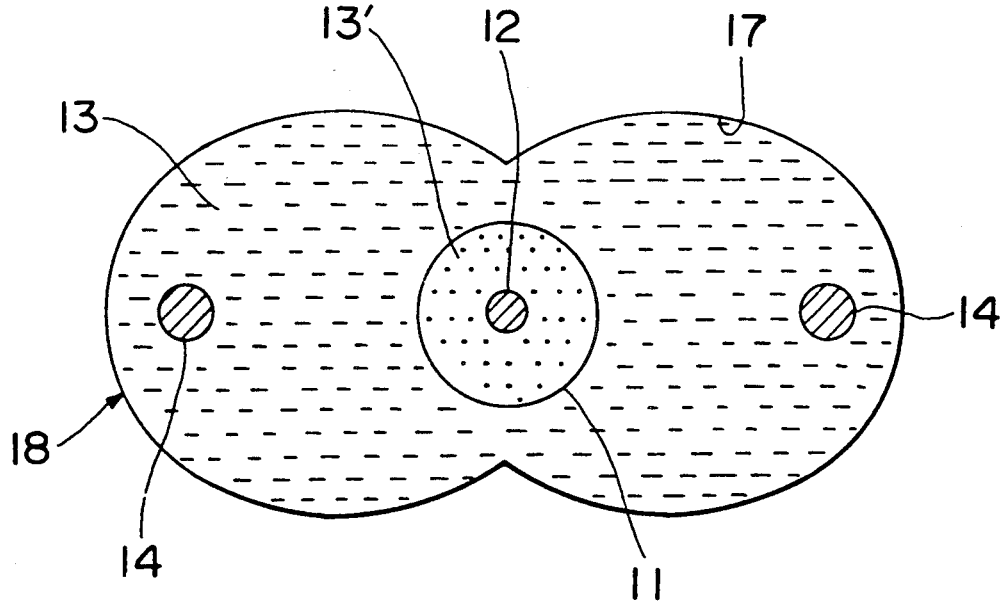
FIG. 6 is a cross sectional view the device shown in FIG. 5.

FIGS. 3 and 4 show schematic sectional views of a solid laser device which is another embodiment of the present invention. In the laser device, a laser medium 2, which is alexandrite, two flash lamps 3, which are light source, and a resonator, which oscillates light emitted from the flash lamps, are provided in a hermetic casing 1. The resonator has a pair of condensing reflectors 5 by which the light emitted from the flash lamps 3 is reflected to the laser medium 2. The reflectors 5 are provided on the inside surface of the hermetic casing 1, and located opposite each other across the laser medium 2. Each focal point of the reflectors 5 is in the same position. A first cooling pipe 6 is provided in the hermetic casing 1 so that a first cooling vessel is constituted by the pipe 6 and the casing 1. The flash lamps 3 are provided in the space between the hermetic casing 1 and the first cooling pipe 6. The first cooling vessel is filled with a first cooling liquid 9 which is pure water and is circulated by a circulator not shown in the drawings. Each of the flash lamps 3 has electrodes 4 at both the ends of the lamp. Electric power for optical pumping is applied to the electrodes 4. The electrodes 4 are fitted with the electrode holders 8. A second cooling pipe 7, which constituted a second cooling vessel, is provided in the first cooling pipe 6 which is for constituting the first cooling vessel. The laser medium 2 is housed in the second cooling pipe 7 which is filled with a second cooling liquid 10 which is pure water and is circulated by a circulator not shown in the drawings. Air is filled in the space between the first and the second cooling pipes 6 and 7, and constitutes an air layer S for thermal insulation.

The light stimulated by the flash lamps 3 proceeds to the laser medium 2 through the cooling liquid 9, the first cooling pipe 6, the air layer S and the second cooling pipe 7 while some of the light is reflected by the reflectors 5. Some of the light coming out of the laser medium 2 is reflected by the opposite reflectors 5 and enters into the medium again. Such operation is repeated so that resonance is created to generate laser light for output. In the meantime, the flash lamps 3 and the laser medium 2 are cooled by the cooling liquids 9 and 10 in the first and the second cooling pipes 6 and 7. Since the cooling liquids 9 and 10 are thermally insulated from each other by the air layer S, the liquids do not thermally affect each other and are therefore stable in operation. For that reason, the temperatures of the flash lamps 3 and the laser medium 2 are appropriately controlled. Thus, the laser device has a cooling means particularly effective to control the temperature of the laser medium whose operation is dependent on the temperature.

The first and the second cooling pipes 6 and 7 are made of a substance high in specific heat and thermal conductivity and transparent as to the wavelength of excited light from a solid laser medium such as alexandrite and sapphire. For example, the substance is a synthetic quartz glass, a natural quartz glass, a cerium-doped natural quartz glass, a titanium-doped natural quartz glass, a Pyrex glass, an Sm filter or the like. The laser medium 2 is not confined to being alexandrite, but may be ruby or glass.

As described above, since the first and the second cooling liquids are thermally insulated from each other, the flash lamps and the laser medium are efficiently cooled without affecting each other. The temperature of the laser medium can thus be kept constant to enable stable laser oscillation.

What is claimed is:

1. A laser device including a laser medium; light source having electrodes to which electric power is applied; and reflectors by which light emitted from said light source is reflected to said medium, characterized in that said light source is housed in a transparent cooling vessel; said vessel is filled with a cooling liquid which is circulated; said electrodes project out of said vessel; and said reflectors are located outside said vessel.

2. A laser device according to claim 1, wherein said light source is housed in a first transparent cooling vessel and the laser medium is housed in a second transparent cooling vessel; the first cooling vessel and the second cooling vessel are independent from each other.

3. A laser device according to claim 1 or 2, wherein the laser medium, the light source and the reflectors are provided in a hermetic casing; and said light source is housed in the cooling vessel in said casing so that the electrodes project out of said vessel and said casing.

4. A laser device including a laser medium; light source having electrodes to which electric power is applied and reflectors by which light emitted from said light source is reflected to said medium, characterized in that said light source is housed in a first cooling vessel; said first cooling vessel is filled with a first cooling liquid; said medium is housed in a second cooling vessel which is transparent; said second cooling vessel is filled with a second cooling liquid; and a heat insulation layer is provided between said first and second cooling vessels of that said first and second cooling liquids are thermally insulated from each other.

5. A laser device according to claim 4, wherein the heat insulation layer is a layer of air.

6. A laser device according to claim 4, wherein the heat insulation layer is a layer of vacuum.

* * * * *